(No Model.)
J. S. MOORE.
CAN FILLING MACHINE.
No. 468,888. Patented Feb. 16, 1892.
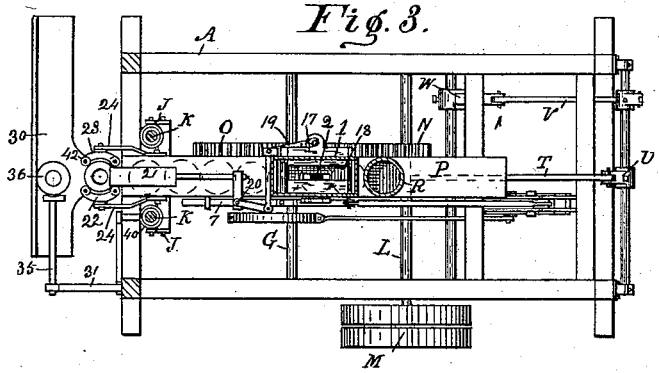
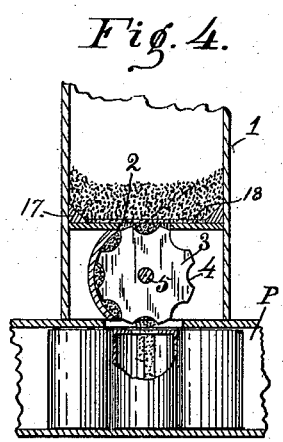
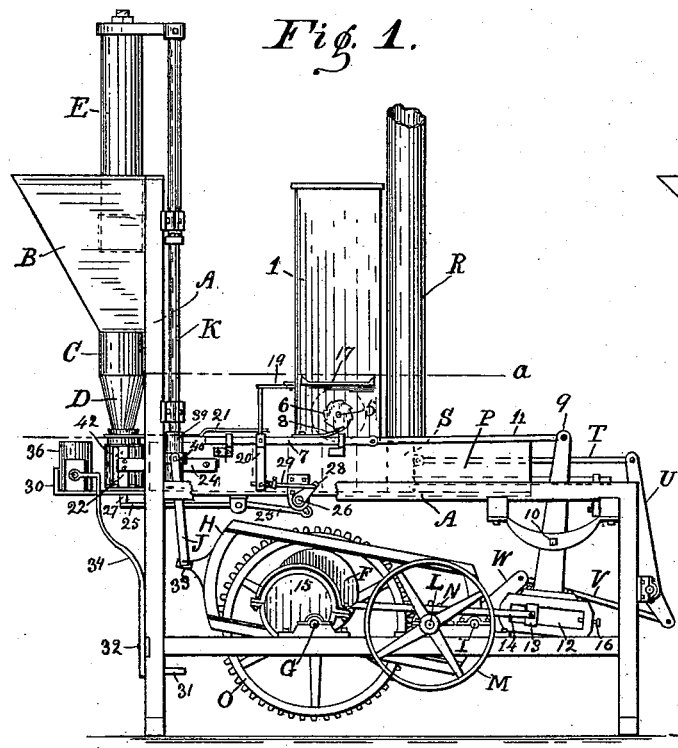
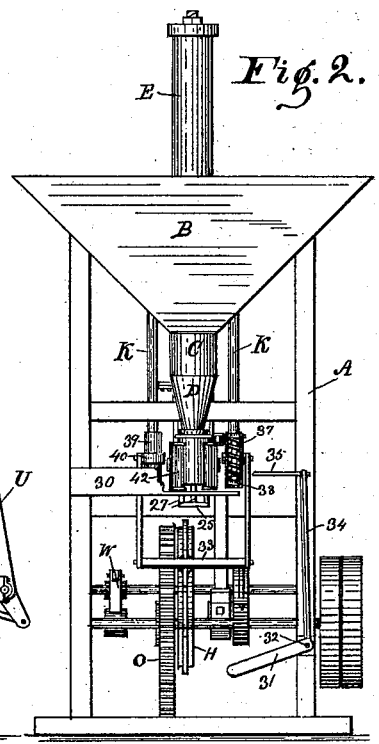
WITNESSES:
A. M. Hood
F. B. Stratford
INVENTOR
James S. Moore
BY
H. P. Hood,
ATTORNEY.

UNITED STATES PATENT OFFICE.

JAMES S. MOORE, OF SULLIVAN, ASSIGNOR OF ONE-HALF TO WILLIAM S. BRISTOL, OF FLAT ROCK, INDIANA.

CAN-FILLING MACHINE.

SPECIFICATION forming part of Letters Patent No. 468,888, dated February 16, 1892.

Application filed September 28, 1891. Serial No. 407,279. (No model.)

*To all whom it may concern:*

Be it known that I, JAMES S. MOORE, a citizen of the United States, residing at Sullivan, in the county of Sullivan and State of Indiana, have invented a new and useful Can-Filling Machine, of which the following is a specification.

My invention relates to an improvement in machines for filling fruit-cans.

The objects of my invention are to provide improved means for automatically delivering to each can a fixed quantity of salt or other condiment and means for removing the filled cans, all combined in a single machine and arranged to co-operate in succession, whereby the empty cans being furnished to the machine at one end thereof are discharged from the other end filled and supplied with the suitable amount of seasoning.

The accompanying drawings illustrate my invention.

Figure 1 represents a side elevation. Fig. 2 represents an end elevation. Fig. 3 is a plan at the line *a*, Fig. 1. Fig. 4 represents a vertical section of the salting mechanism on a larger scale.

In the drawings, A indicates the frame of the machine. B is a hopper having at its lower end a cylindrical chamber C and a tapered spout D.

E is a plunger, adapted at its lower end to fill the chamber C and mounted on the frame A, so as to have a reciprocating vertical movement within the hopper and its chamber C. A reciprocating motion is imparted to the plunger E by means of a cam F, mounted on a shaft G, arranged to revolve in suitable bearings on the main frame, said cam being arranged to engage a slotted lever H, which is secured at one end to a rock-shaft I, mounted in bearings on the main frame, said lever being connected at the other end by a link J with the guide-rods K K, to which the plunger E is secured. Motion is imparted to shaft G and cam F by means of the driving-shaft L, carrying the driving-belt pulley M and a pinion N, and a gear-wheel O, engaging pinion N and secured to the shaft G.

Arranged on the upper part of frame A is a horizontal trough or way P, adapted to receive a series of cans from the vertical chute R. Arranged in trough P, so as to traverse back and forth beneath the chute R, is a plunger S. (Shown in Fig. 1 in dotted lines.) Said plunger is connected by means of rod T, lever U, and link V with an arm W, which is secured to the rock-shaft I, so as to move therewith.

Arranged above trough P in front of chute R is the salt-chamber 1, having in its bottom a perforation 2. Arranged beneath the bottom of the salt-chamber is a cylinder 3, having in its periphery a series of cups or recesses 4, each of which is adapted to contain the required amount of salt or other condiment for one can. Disk 3 is mounted on a shaft 5 and is arranged to revolve in a vertical plane beneath the opening 2 in the bottom of the salt-chamber. Shaft 5 is rotated by means of a ratchet-wheel 6, secured to the shaft, a reciprocating-bar 7, arranged to slide in suitable bearings on the trough P, and having a spring-pawl 8, secured thereto and arranged to engage the ratchet-wheel 6. Bar 7 is given at each revolution of shaft G an intermittent reciprocating movement by means of a lever 9, pivoted to the main frame at 10, connected to the bar 7 by rod 11 and having at its lower end a slotted opening 12, in which is mounted a sliding block 13, which is connected by a rod 14 with a cam 15, which is secured to the shaft G, so as to revolve therewith. Lever 9 is provided at each end of slot 12 with an adjusting-screw 16, the whole arrangement being such that at each revolution of shaft G disk 3 is turned, so as to bring one of the recesses 4 to register with the opening 2 in the bottom of the salt-chamber, while the corresponding recess on the opposite side of the disk discharges the salt previously received into the fruit-can below. For the purpose of agitating the salt in chamber 1 and insuring the proper filling of the recesses in disk 3, I mount above the bottom of the salt-chamber a sliding plate 17, having the central perforation 18. Plate 17 is given a horizontal reciprocating movement in chamber 1 by means of the bell-crank lever 19 and a vertical bar 20, secured to the bar 7, so as to move therewith. Secured to a horizontal extension of bar 20 is a sliding valve 21, which projects across and closes the lower end of spout D at each forward movement of bar 7.

For the purpose of holding the cans properly in position beneath the spout D, I provide a pair of jaws 22 and 23, having in the opposed faces of each a pair of vertical friction-rollers 42. Jaws 22 and 23 are arranged opposite the discharging end of trough P and are each secured thereto by means of a flat spring 24, the arrangement being such that as the can leaves the mouth of trough P it is forced between the rollers of the opposed jaws and is held with a yielding pressure centrally beneath spout D. For the purpose of forcing the mouth of the fruit-can closely against the end of spout D during the process of filling I pivot to the under side of trough P a lever 25, which is connected at one end with a rock-shaft 26, and at the other end it it is provided with upwardly-projecting studs 27, which engage the bottom of the can. Lever 25 is given a vibratory movement in a vertical plane by means of an arm 28, secured to the rock-shaft 26, and connected by rod 29 with the lower end of bar 20, the arrangement being such that at each backward movement of bar 7, to which bar 20 is secured, the free end of lever 25 is raised, bringing studs 27 into contact with the bottom of the can, and thus forcing the can closely against the end of spout D.

For the purpose of receiving the filled cans a chute 30 is arranged in front of jaws 22 and 23 and the cans are propelled along this chute by means of the bell-crank lever 31, pivoted to the main frame at 32 and having one end arranged in the path of a cross-beam 33, which is secured to the free end of lever H, the upper arm 34 being provided with an extension 35, arranged to engage the can 36, the arrangement being such that at each downward movement of lever H the upper end of arm 34 moves over a distance equal to the diameter of the can. For the purpose of preventing an undue strain on guide-rods K K in case the plunger E meets an obstruction in chamber C before lever H has completed its downward stroke a yielding connection is made between the links J and rods K by means of a spring 37, mounted on the lower end of rod K and engaging a collar 38 thereon, a sleeve 39, arranged to embrace spring 37 and to engage its upper end and having a collar 40, to which the link J is pivoted.

The operation of my machine is as follows: Chute R being filled with empty fruit-cans and chamber 1 being supplied with salt or other condiment, one of the cans passes down into the trough P in front of the plunger S. The machine being started, the cans are successively pushed forward by the reciprocating movement of the plunger S, and as they pass beneath disk 3 each receives the contents of one of the cells 4 in disk 3, the disk being turned forward the space of one cell at each backward movement of the sliding bar 7 and the cans continuing to move forward until trough P is filled and one of the cans has been forced between the jaws 22 and 23 and is in position beneath spout D. A quantity of the prepared fruit is now placed in hopper B, filling chamber C and spout D and a portion passing into the can by the force of gravitation. The parts are now in the position represented in Fig. 1. The further movement of the driving-pulley in the direction indicated by the arrow adjacent thereto revolves wheel O and shaft G in the opposite direction, thus depressing lever H and forcing plunger E down into chamber C, the purpose of this movement being to overcome any obstruction in spout D arising from large pieces of fruit becoming lodged there, thus supplementing the force of gravitation and insuring the complete filling of every can in the proper time. At the same time the movement of cam 15, with shaft G, causes block 14 to move along slot 12 in lever 9 without communicating any movement to said lever until the block engages set-screw 16, and then operating during the completion of the stroke of cam 15 to throw the upper end of lever 9 toward the hopper, thus sliding bars 7 and 20 and sliding valve 21 in the same direction, and thus closing the mouth of spout D. In the meantime plunger S has completed its backward movement and has again moved forward into engagement with another can and, forcing the whole series forward, forces the filled can out of the retaining-jaws 22 and 23 and into the trough 30. During the backward movement of bar 7 the free end of lever 25 is raised, as before described, valve 21 is opened, and the can is raised closely against the mouth of spout D. As lever H moves downward the cross-bar 33 attached thereto comes in contact with lever 31, and the filled can is by the movement of lever 31 pushed along chute 30.

In the machine thus organized the cans are automatically provided with suitable seasoning and are filled without waste of material—results heretofore unattained in this class of machines.

I claim as my invention—

1. In a can-filling machine, the combination of the shaft G, having cam 15 secured thereto, connecting-rod 14, lever 9, pivoted to the main frame and having at its lower end the slotted opening 12, provided with adjusting-screws 16, sliding block 13, mounted in said slotted opening and attached to rod 14, reciprocating bar 7, provided with spring-pawl 8 and connected with lever 9, salt-chamber 1, shaft 5, having recessed disk 3 secured thereto and arranged beneath said salt-chamber, and ratchet-wheel 6, all arranged to co-operate substantially as shown and described, whereby an intermittent movement is imparted to disk 3 by the continuous movement of shaft G.

2. The combination, with the salt-chamber having opening 2 in its bottom, shaft 5, carrying ratchet-plate 6, and disk 3, having recesses in its periphery arranged to register with the opening in the salt-chamber, and the reciprocating bar 7, having a pawl arranged to engage said ratchet-plate, of the plate 17, having perforation 18 and arranged to slide transversely across the salt-chamber, and the intermediate connecting mechanism connecting the slide-bar 7 with said plate, substantially as shown and described, whereby the plate and the recessed disk are moved simultaneously, substantially as and for the purpose set forth.

3. In a can-filling machine, the combination of the main frame, the hopper mounted on the main frame, the jaws arranged to hold the can beneath said hopper, chute 30, arranged to receive the filled cans from said jaws, the oscillating lever H, having cross-bar 33, and lever 31, all arranged to co-operate substantially as and for the purpose set forth.

JAMES S. MOORE.

Witnesses:
H. P. HOOD,
A. M. HOOD.